US009286658B2

(12) United States Patent
Bhaskaran

(10) Patent No.: US 9,286,658 B2
(45) Date of Patent: Mar. 15, 2016

(54) IMAGE ENHANCEMENT

(75) Inventor: Vasudev Bhaskaran, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 907 days.

(21) Appl. No.: 13/427,167

(22) Filed: Mar. 22, 2012

(65) Prior Publication Data
US 2013/0251281 A1 Sep. 26, 2013

(51) Int. Cl.
*G06T 5/00* (2006.01)

(52) U.S. Cl.
CPC ....... G06T 5/002 (2013.01); *G06T 2207/10028* (2013.01); *G06T 2207/20012* (2013.01)

(58) Field of Classification Search
CPC ......... G06T 15/00; G06T 15/10; G06T 5/002; G06T 2207/10028; G06T 2207/20012; H04N 13/0018; H04N 13/0495; H04N 13/0497; H04N 13/004
See application file for complete search history.

(56) References Cited

U.S. PATENT DOCUMENTS

| 6,108,005 | A  | * | 8/2000  | Starks et al. ............... 345/419 |
| 6,496,598 | B1 | * | 12/2002 | Harman ...................... 382/154 |
| 7,911,513 | B2 |   | 3/2011  | Garrison et al. |
| 2008/0012850 | A1 | * | 1/2008  | Keating, III ................. 345/419 |
| 2008/0170067 | A1 | * | 7/2008  | Kim et al. ................... 345/419 |
| 2008/0303894 | A1 | * | 12/2008 | Ernst et al. ................... 348/43 |
| 2009/0003708 | A1 |   | 1/2009  | Steinberg et al. |
| 2009/0290796 | A1 |   | 11/2009 | Shi et al. |
| 2010/0329588 | A1 | * | 12/2010 | Cheatle ........................ 382/298 |
| 2011/0090311 | A1 |   | 4/2011  | Fang et al. |
| 2011/0109720 | A1 | * | 5/2011  | Smolic et al. .................. 348/43 |
| 2011/0149019 | A1 |   | 6/2011  | Kellerman et al. |
| 2011/0273529 | A1 | * | 11/2011 | Lai et al. ......................... 348/42 |
| 2012/0082368 | A1 | * | 4/2012  | Hirai et al. ..................... 382/154 |
| 2012/0120192 | A1 | * | 5/2012  | Alregib et al. .................. 348/43 |
| 2012/0300025 | A1 | * | 11/2012 | Tchoukaleysky ............... 348/42 |
| 2013/0148859 | A1 | * | 6/2013  | Inoue ................. H04N 13/0018 382/106 |

FOREIGN PATENT DOCUMENTS

WO       2010087955 A1    8/2010
WO   WO2012/020558 A1 *  2/2012

OTHER PUBLICATIONS

International Preliminary Report on Patentability dated May 16, 2014 from International Application No. PCT/US2013/026927, 9 pp.
Second Written Opinion from International Application No. PCT/US2013/026927, dated Feb. 21, 2014, 7 pp.
Response to Second Written Opinion dated Feb. 21, 2014, from International Application No. PCT/US2013/026927, filed Apr. 15, 2014, 29 pp.
Guo, C. et al., "Spatio-temporal Saliency Detection Using Phase Spectrum of Quaternion Fourier Transform," IEEE Computer Vision and Pattern Recognition Conference, 2008, 8 pp.

(Continued)

*Primary Examiner* — Edward Park
(74) *Attorney, Agent, or Firm* — Shumaker & Sieffert, P.A.

(57) ABSTRACT

Techniques described in the disclosure are generally related to enhancing portions of an image relative to other portions of the image. The example techniques may utilize depth information in conjunction with one or more viewer perceivable information to enhance portions of the image relative to other portions. The techniques may then display the enhanced image to provide the viewer with a possibly more realistic image.

29 Claims, 7 Drawing Sheets

(56) References Cited

OTHER PUBLICATIONS

International Search Report and Written Opinion—PCT/US2013/026927—ISA/EPO—May 15, 2013, 12 pp.

Pourazad et al., "An H.264-based scheme for 2D to 3D video conversion", IEEE Transactions on Consumer Electronics, IEEE Service Center, New York, NY, US, vol. 55, No. 2, May 1, 2009, pp. 742-748.
Response to Written Opinion dated May 15, 2013, from International application No. PCT/US2013/026927, filed Aug. 29, 2013, 25 pp.

* cited by examiner

IMAGE ENHANCEMENT

TECHNICAL FIELD

This disclosure relates to image enhancement, and more particularly, image enhancement on a constructed image.

BACKGROUND

Various devices are operable to display videos or images. For example, the device may download the video or image, or may capture the video or image with a digital camera. The downloaded, captured, or otherwise generated videos or images are displayed on a display. For example, videos may be displayed as a sequence of frames.

SUMMARY

In general, this disclosure describes techniques for image enhancement. Image enhancement refers to enhancing a constructed frame of a video, or a constructed individual image. In other words, the described techniques may be applicable for stand-alone images or frames of a video. As described in more detail, the techniques may utilize a depth map that indicates relative depth of objects within an image in conjunction with another perception map to determine whether a pixel in the image should be enhanced relative to other pixels.

In one example, the disclosure describes a method for image processing that includes receiving an image, and determining depth map values for a depth map for the image that indicates relative depth of pixels within the image. The method also includes determining perception map values for a perception map for the image, and enhancing a first portion of the image relative to a second portion of the image based on at least the depth map values and the perception map values.

In another example, the disclosure describes a device that includes a memory configured to store an image, and one or more processing units. The one or more processing units are configured to receive the image, and determine depth map values for a depth map for the image that indicates relative depth of pixels within the image. The one or more processing units are also configured to determine perception map values for a perception map for the image, and enhance a first portion of the image relative to a second portion of the image based on at least the depth map values and the perception map values.

In another example, the disclosure describes a device that includes means for receiving an image, and means for determining depth map values for a depth map for the image that indicates relative depth of pixels within the image. The device also includes means for determining perception map values for a perception map for the image, and means for enhancing a first portion of the image relative to a second portion of the image based on at least the depth map values and the perception map values.

In another example, the disclosure describes a computer-readable storage medium. The computer readable-storage medium comprises instructions that cause one or more processors to receive an image, determine depth map values for a depth map for the image that indicates relative depth of pixels within the image, determine perception map values for a perception map for the image, and enhance a first portion of the image relative to a second portion of the image based on at least the depth map values and the perception map values.

The details of one or more examples are set forth in the accompanying drawings and the description below. Other features, objects, and advantages will be apparent from the description and drawings, and from the claims.

DETAILED DESCRIPTION

In general, this disclosure is related to image enhancement techniques to enhance an image or images using viewer perceivable information associated with an image. The image may be a static image (e.g., a picture taken from a camera), or part of video data (e.g., a frame of video data). In some examples, the images may be a right-eye image and a left-eye image (e.g., as part of a stereoscopic video), or images for a multi-view video.

As described in more detail, one or more processing units of a device may implement the image enhancement techniques described in this disclosure. The example techniques described in this disclosure may provide for a more realistic image by performing image enhancement using viewer perceivable image information. For example, the one or more processing units may perform contrast enhancement, sharpening and blurring, color enhancement, or any combination thereof on portions of an image based on the perceivable information such as depth information in conjunction with motion information and/or saliency information.

Figure 1:
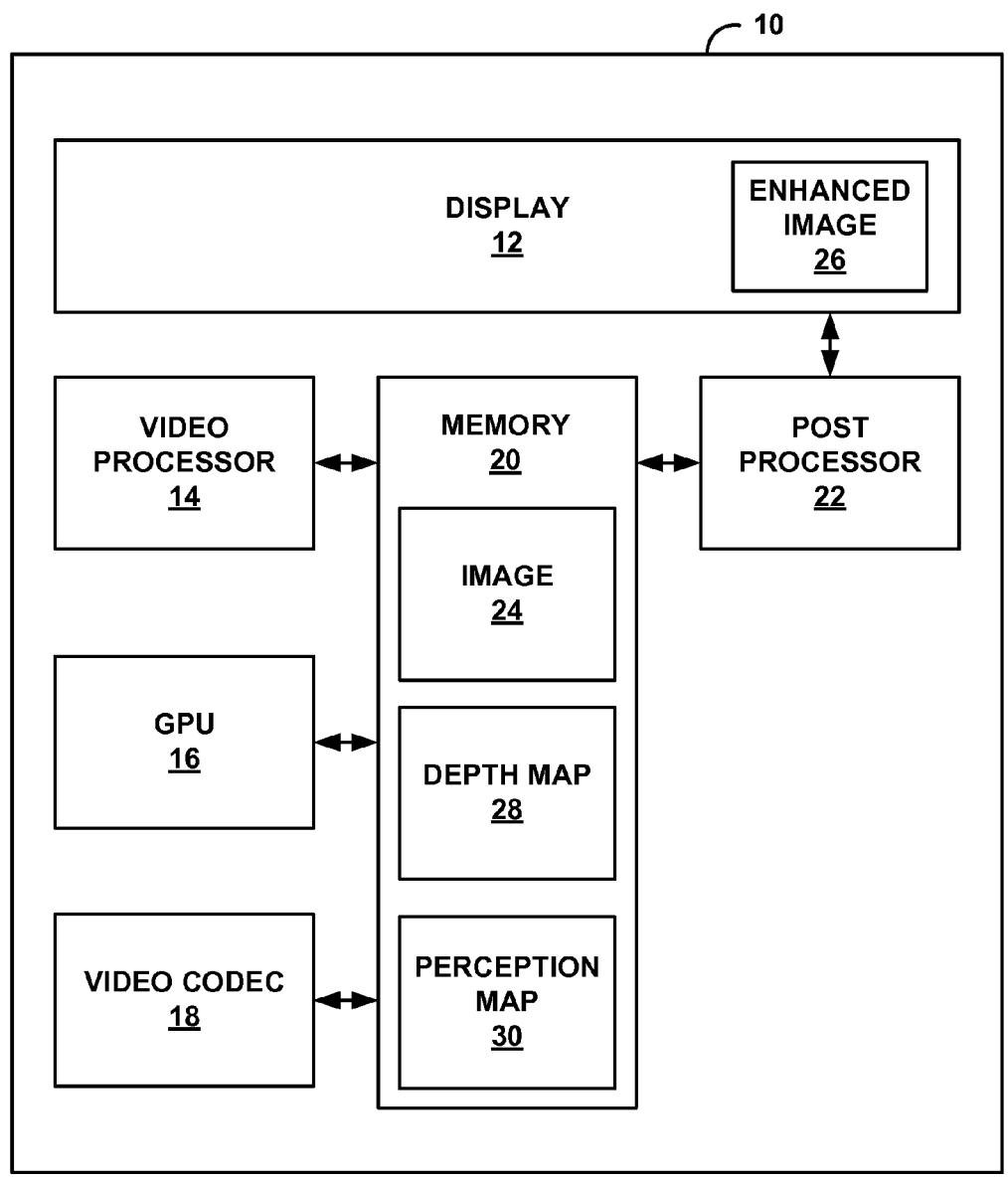
FIG. 1 is a block diagram illustrating an example of a device that may implement one or more aspects of this disclosure.

FIG. 1 is a block diagram illustrating an example of a device that may implement one or more aspects of this disclosure. For example, FIG. 1 illustrates device 10. Examples of device 10 include, but are not limited to, video devices such as media players, set-top boxes, wireless handsets such as mobile telephones, personal digital assistants (PDAs), desktop computers, laptop computers, gaming consoles, video conferencing units, tablet computing devices, and the like. As illustrated, device 10 may include display 12, video processor 14, graphics processing unit (GPU) 16, video encoder/decoder (codec) 18, memory 20, and post processor 22. Device 10 may include components in addition to those illustrated in FIG. 1. For example, FIG. 9 illustrates an example of device 10 that includes more components than those illustrated in FIG. 1.

Examples of video processor 14, GPU 16, video codec 18, and post processor 22 include, but are not limited to, a digital signal processor (DSP), a general purpose microprocessor, an application specific integrated circuit (ASIC), a field programmable logic array (FPGA), or other equivalent integrated or discrete logic circuitry. Furthermore, although video processor 14, GPU 16, video encoder-decoder (codec) 18, and post processor 22 are illustrated as separate components, aspects of this disclosure are not so limited. In alternate examples, one or more of video processor 14, GPU 16, video codec 18, and post processor 22 may be part of a common integrated circuit. For purposes of illustration and ease of description, video processor 14, GPU 16, video codec 18, and post processor 22 are illustrated as separate components.

Also, this disclosure describes post processor 22 as implementing the example techniques. In alternate examples, any one of the processing units of device 10 may implement the techniques described in this disclosure. For example, video processor 14, GPU 16, video codec 18, post processor 22, a display processor or a central processing unit (CPU) of device 10 may implement the techniques described in this disclosure. To indicate this, in some examples, this disclosure describes a processing unit as performing the techniques described in this disclosure. Examples of such a processing unit include video processor 14, GPU 16, video codec 18, post processor 22, the display processor of device 10 or the CPU of device 10. In some examples, post processor 22 may be formed within one of the other processing units. For example, the display processor of device 10 may include post processor 22. In this example, the techniques described in this disclosure may be considered as being performed by the display processor.

Video processor 14, GPU 16, and/or video codec 18 may output image data to memory 20. For example, memory 20 may store image 24 which is a constructed image generated from any one of video processor 14, GPU 16, or video codec 18. It may be possible for other components not shown in FIG. 1 to generate image 24 and store image 24 in memory 20, and video processor 14, GPU 16, and video codec 18 are described for purposes of illustration. Post processor 22 may retrieve image 24 from memory 20, enhance image 24 to generate enhanced image 26, and present enhanced image 26 on display 12.

Enhancing image 24 to generate enhanced image 26 may refer to modifying pixel values such as color values of pixels within image 24 such that an overall appearance of enhanced image 26 is of higher quality than image 24. One example of the higher quality of enhanced image 26, as compared to image 24, may be that enhanced image 26 appears more realistic than image 24; although, other examples of higher quality may be achieved utilizing the techniques of this disclosure. For example, as described in more detail, post processor 22 may enhance contrast, sharpness, and/or color of pixels within a portion of image 24 relative to another portion in image 24 to generate enhanced image 26. Such enhancement may result in enhanced image 26 appearing more realistic than image 24. Furthermore, as described in more detail, post processor 22 may utilize viewer perceivable information such as depth information, motion information, and saliency information, as three examples, to determine which portions of image 24 to enhance relative to the other portions.

Image 24 may be referred to as a constructed image to indicate that image 24 is a complete image with pixel values for each of the pixels of image 24. For example, one of video processor 14, GPU 16, or video codec 18 may complete its respective functions to generate image 24 and store image 24 in memory 20. As described in more detail, the example techniques described in this disclosure may enhance such a constructed image, and display the enhanced image. In other words, image 24 may be in condition for being displayed; however, the example techniques described in this disclosure may enhance image 24 prior to display.

Display 12 may comprise a liquid crystal display (LCD), an organic light emitting diode display (OLED), a cathode ray tube (CRT) display, a plasma display, or another type of display device. Examples of memory 20 include, but are not limited to, a random access memory (RAM), a read only memory (ROM), an electrically erasable programmable read-only memory (EEPROM), CD-ROM or other optical disk storage, magnetic disk storage, or other magnetic storage devices, flash memory, or any other medium that can be used to store desired program code in the form of instructions or data structures and that can be accessed by a central processing unit (CPU) of device 10, video processor 14, GPU 16, video codec 18, and post processor 22. In some examples memory 20 may comprise one or more computer-readable storage media, such as a computer-readable storage device. For instance, in some example implementations, memory 20 may include instructions that cause post processor 22 to perform the functions ascribed to post processor 22 in this disclosure.

Memory 20 may, in some examples, be considered as a non-transitory storage medium. The term "non-transitory" may indicate that the storage medium is not embodied in a carrier wave or a propagated signal. However, the term "non-transitory" should not be interpreted to mean that memory 20 is non-movable. As one example, memory 20 may be removed from device 10, and moved to another device. As another example, a storage device, substantially similar to memory 20, may be inserted into device 10. In certain examples, a non-transitory storage medium may store data that can, over time, change (e.g., in RAM).

As one example, a user may desire to view video content on display 12. Video processor 14 may process the video content and store the video content as a series of images 24 (referred to as frames or pictures) in memory 20. Post processor 22 may retrieve each of images 24 from memory 20, enhance images 24, and display them via display 12 at a particular frame rate so that the user experiences a smooth playing of the video.

As another example, a user may desire to play a video game on device 10. In this example, GPU 16 may generate graphics content for the video game in the form of images 24 that GPU 16 stores in memory 20. Post processor 22 may retrieve the video game images 24 from memory 20, enhance images 24, and display them via display 12. Applications other than the video game may also generate graphics content that post processor 22 may retrieve, enhance, and display on display 12.

As yet another example, video codec 18 may decode received video content. Similar to video processor 14, the decoded video content may be a series of images 24. Video codec 18 may store these series of images in memory 20. Similar to video processor 14, post processor 22 may retrieve images 24 from memory 20, enhance images 24, and display them via display 12.

Prior to displaying images 24 on display 12, post processor 22 may perform image enhancement. Display 12 may then display this enhanced image. For example, FIG. 1 illustrates display 12 as displaying enhanced image 26. Enhanced image 26 is the resulting image from the enhancing of image 24.

Although FIG. 1 illustrates post processor 22 receiving image 24 from memory 20, e.g., system memory, aspects of this disclosure are not so limited. It may be possible for post processor 22 to receive image 24 directly from any one of video processor 14, GPU 16, and video codec 18, e.g., by direct memory transfer, rather than through system memory 20. However, for purposes of brevity, the techniques are described with respect to post processor 22 receiving image 24 from memory 20.

Post processor 22 may implement various techniques to enhance image 24 and generate enhanced image 26. As one example, post processor 24 may utilize values of a depth map in conjunction with values of another perception map to enhance image 24. For instance, as illustrated in FIG. 1, memory 20 stores values of depth map 28 and perception map 30. Post processor 22 may retrieve the values of depth map 28 and perception map 30 from memory 20 and utilize one or more of these values to enhance image 24.

For example, post processor 22 may utilize the values of depth map 28 and perception map 30 to determine which portions of image 24 should be enhanced relative to other portions, and in some examples, by how much. Post processor 22 may utilize any enhancement scheme to enhance portions of image 24. For example, post processor 22 may enhance the contrast between pixels in the portion of image 24 to be enhanced relative to the pixels in other portions of image 24. As another example, post processor 22 may enhance the sharpness between pixels in the portion of image 24 to be enhanced relative to pixels in other portions of image 24. As yet another example, post processor 22 may enhance the color of pixels in the portion of image 24 to be enhanced relative to pixels in other portions of image 24.

As discussed in more detail, there may be various ways to determine the values of depth map 28 and perception map 30. The techniques described in this disclosure are not limited to the specific examples of the manner in which the values of depth map 24 and perception map 30 are determined. In general, the techniques described in this disclosure may be extendable to any manner in which the values of depth map 24 and perception map 30 are determined.

Depth map 28 may provide a relative measure of the "depth" of the pixels of image 24, referred to as depth information. The term "depth" as used in this disclosure is a perspective depth. For example, image 24 is a 2-dimensional (2D) image, and depth in this context refers to the perception that certain objects appear further away than other objects in the 2D image.

The values of depth map 28 may indicate relative depth for corresponding pixels in image 24. As one example, depth map 28 may be considered as a 2D map that provides an estimate for the depth of each pixel within image 24 (e.g. the still image or the frame of video). In this example, depth map 28 may be the same size as image 24 with a plurality of locations that each correspond to one pixel of image 24. Each of these locations in depth map 28 may include a value that indicates the depth of its corresponding pixel in image 24. For example, depth map 28 may indicate which pixels of image 24 are foreground pixels (e.g., appear to be relatively in the front within image 24) and which pixels of image 24 are background pixels (e.g., appear to be relatively in the back within image 24).

Similar to depth map 28, perception map 30 may include values for corresponding pixels in image 24. The values of perception map 30 may indicate additional information regarding image 24. As one example, the values of perception map 30 may provide motion information. In this example, perception map 30 may be referred to as a motion information map. For instance, in examples where image 24 is one of a sequence of frames for video or graphics (e.g., as part of a video game), the motion information may indicate positional changes in objects of image 24 relative to previous or future frames. For example, when a sequence of frames, one of which includes image 24, is displayed, the viewer may perceive an object such as a car moving across the screen displaying the frames.

Objects, as referred to in this disclosure, refer to distinct, viewer identifiable items within image 24. A car is such an example of an object, although other examples of objects, including stationary objects (i.e., objects whose position does not change from one frame to the next) are contemplated by this disclosure. Objects within image 24 may be encompassed by a plurality of the pixels of image 24. In this example, motion information, as provided by values of perception map 30, may include values such as velocity and direction and/or coordinates.

For example, one pixel in image 24 for an object may have a corresponding pixel in at different location within a previous frame or subsequent frame for the same object. The motion information for the pixel in image 24 may provide some measure of how quickly the object is moving and in what direction, and/or the coordinates for the corresponding pixel in the previous frame or subsequent frame. Corresponding pixel, as used in this disclosure, should not be confused with co-located pixel; although, it is possible for the corresponding pixel to also be a co-located pixel (e.g., when there is no motion). Co-located pixel refers to pixels in the same location in different frames. Corresponding pixel refers to a pixel in a previous or subsequent frame that is at the same location within the object as a pixel in image 24.

Another example of perception map 30 may be a saliency map. The values of the saliency map may provide saliency information, which is some measure of how "salient" pixels are within image 24. For example, to provide a viewer with a desirable viewing experience, it may be beneficial to draw the viewer's attention more to certain pixels as compared to other pixels. The values of the saliency map may indicate to which pixels a viewer's attention should be drawn, as compared to other.

There may be other examples of perception map 30, in addition to motion information map and saliency map, and aspects of this disclosure should not be considered to the perception map 30 being limited to a motion information map and saliency map. Furthermore, although FIG. 1 illustrates memory 20 storing a single perception map 30, aspects of this disclosure are not so limited. Memory 20 may store one or more perception maps. For example, memory 20 may store one perception map 30 as a motion information map, and another perception map 30 as a saliency map. In such examples, the example techniques may utilize values from depth map 28, the motion map, and the saliency map for enhancing image 24.

Utilizing values from at least depth map 28 and perception map 30 to enhance image 24 may result in a relatively more realistic image. In other words, enhanced image 26 may be a more realistic image as compared to image 24. As one example, in realistic images, foreground pixels of image 24 may appear sharper, clearer, and/or richer compared to background pixels of image 24. Depth map 28 may provide values that indicate which pixels of image 24 are foreground pixels and which ones are background pixels, and it may be possible to enhance image 24 based on values indicative of which pixels are foreground pixels and which pixels are background pixels.

In some examples, relying solely on depth information, as provided by depth map 28, may potentially be insufficient to provide a realistic image. For example, pixels of an object within image 24 may be in foreground. However, because the object is moving, the object should not appear as clear as other objects. For instance, imagine an object (e.g., a car) is in the foreground of image 24, and that the car is moving (e.g., as evidenced by sequential display of frames preceding and subsequent to image 24). In this example, the car may not appear clearer, as compared to other objects, because of its movement. Furthermore, the faster the car is moving, the less clear it will realistically appear. As described in more detail, post processor 22 may utilize depth information from depth map 28 and motion information from perception map 30 to enhance a first portion of image 24 (e.g., foreground of image 24) relative to a second portion of image 24 (e.g., background of image 24). In this manner, post processor 22 may taken into account both depth information and motion information to determine how much to enhance portions of image 24 relative to other portions of image 24.

In some examples, saliency information may further assist post processor 22 in determining which pixels of image 24 should be enhanced. For example, depth information from depth map 28 may indicate that a particular pixel is in the foreground, and the saliency information from perception map 30, in this example, may indicate that that particular pixel is salient. In this example, post processor 22 may utilize both the depth information and the saliency information to determine how much to enhance that particular pixel relative to other pixels.

As another example, depth information from depth map 28 may indicate that particular pixel is in the background, and the saliency information from perception map 30, in this example, may indicate that that particular pixel is salient. To avoid such a background pixel from being blurred too much, or even to be enhanced, post processor 22 may utilize the values of depth map 28 in conjunction with the values of the saliency map to determine how much to enhance that particular pixel relative to other pixels.

Figure 2:
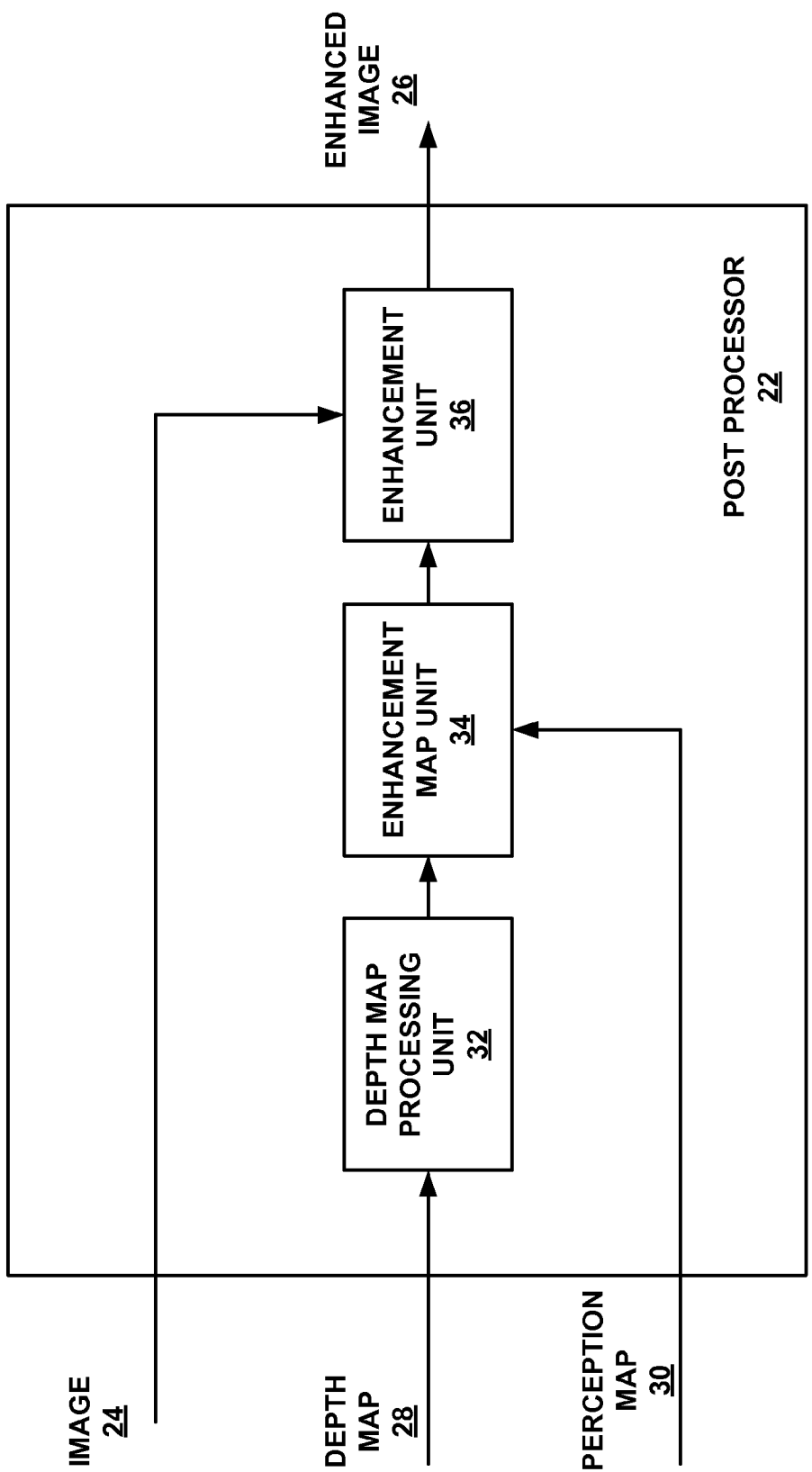
FIG. 2 is a block diagram illustrating an example of a post processor that may implement on or more techniques described in this disclosure.

FIG. 2 is a block diagram illustrating an example of a post processor 22 that may implement one or more techniques described in this disclosure. Post Processor 22 may utilize viewer perceivable qualities of image 24 to enhance portions of image 24 relative to other portions of image 24. For example, post processor 22 may enhance foreground pixels more than background pixels within image 24. There may be various ways in which post processor 22 may enhance a portion of image 24 relative to other portions of image 24. For instance, post processor 22 may enhance a first portion and not enhance a second portion. As another example, the post processor 22 may blur the second portion and not modify the first portion. As yet another example, the post processor 22 may sharpen the first portion and blur the second portion. In these examples, the first portion may appear clearer than the second portion. Accordingly, in these examples, the enhancement of the first portion is relative to the second portion.

As described above, post processor 22 may utilize values of depth map 28 and perception map 30 for enhancing portions of image 24. There may be various ways in which to determine the values of depth map 28 and perception map 30, as described below. These example techniques to determine the values of depth map 28 and perception map 30 are provided for purposes of illustration, and should not be considered limiting. Moreover, the techniques may be utilized in conjunction with one another, or any combination thereof. For example, device 10 may utilize one technique to determine the values of depth map 28 and utilize the same or different technique to determine the values of perception map 30.

As one example, in instances where device 10 downloads image 24 or the video that includes image 24 from another device, the other device may provide values for depth map 28 and perception map 30 along with image 24. In this example, video codec 18, as one example, may receive image 24 along with depth map 28 and perception map 30. Video coded 18 may then store the pixel values of image 24 and the values of depth map 28 and perception map 30 in memory 20. Post processor 22 may then determine the pixel values of image 24 and the values of depth map 28 and perception map 30 by receiving these values from memory 20. Post processor 22 may then enhance portions of image 24 relative to other portions with the received information, as described in more detail.

As another example, a module in device 10 may generate values of depth map 28 and perception map 30. As one example, video processor 14 may receive captured image 24 or a video that includes image 24 from a camera that is part of device 10 or coupled to device 10. In this example, video processor 14 may execute an algorithm to generate the values of depth map 28 and perception map 30. Video processor 14 may then store the values of depth map 28 and perception map 30 in memory 20. Similar to above, post processor 22 may then enhance portions of image 24 relative to other portions with the received information, as described in more detail.

In some examples, GPU 16 may generate values of depth map 28 and perception map 30. For instance, image 24 may be still graphics image or a graphics image that is part of series of graphics images (e.g., an image in a video game). In this example, GPU 16 may generate values of depth map 28 and perception map 30 in addition to generating image 24. GPU 16 may then store the pixel values of image 24 and the values of depth map 28 and perception map 30 in memory 20. Similar to above, post processor 22 may then enhance portions of image 24 relative to other portions with the received information, as described in more detail.

In some cases, it may be possible for post processor 22 to determine the values of depth map 28 and perception map 30. In this example, post processor 22 may store the values of depth map 28 and perception map 30 in memory 20 for temporary storage. Alternatively, post processor 22 may store the values of depth map 28 and perception map 30 in local memory. In this example, memory 20 may not store the values of depth map 28 and perception map 30.

As described above, any one of video processor 14, GPU 16, video codec 18, and post processor 22 may generate the values of depth map 28 and perception map 30. Also, as described above, any one of video processor 14, GPU 16, video codec 18, and post processor 22 may implement the enhancement techniques described in this disclosure. To illustrate this, the examples techniques of this disclosure may be considered as being implemented by one or more processing units. Examples of the one or more processing units include video processor 14, GPU 16, video codec 18, and post processor 22. For example, one processing unit may determine the values of depth map 28 and perception map 30, and another processing unit or the same processing unit may implement the example enhancement techniques described in this disclosure. Moreover, in some examples, a display processor may be another example of the one or more processing units. For instance, in some examples, post processor 22 may be considered as a display processor. For purposes of illustration and brevity, the example techniques are described as being performed by post processor 22.

In examples where device 10 does not receive the values of depth map 28 and/or perception map 30, the one or more processing units may implement one or more well-known algorithms to determine the values of depth map 28 and/or perception map 30. As one example, the one or more processing units may utilize shadow information to estimate the depth of pixels within image 24. As another example, the one or more processing units may utilize motion information to determine values of depth map 28. For example, objects that appear to be moving fast are generally considered to be in the foreground, and objects that appear to be moving more slowly are generally considered go be in the background. For instance, an airplane flying in the sky (e.g., in the background) appears to be moving more slowly compared to a car zooming in the foreground. In this example, the one or more processing units may use the motion information to determine depth values of depth map 28 (e.g., determine that the airplane is in the background and the car is in the foreground), and also use motion information to determine the values of perception map 30 (e.g., in examples where perception map 30 is a motion information map).

There may be various techniques to determine the values of perception map 30 in examples where perception map 30 is a saliency map. One such example technique is described in "Spatio-temporal Saliency Detection Using Phase Spectrum of Quaternion Fourier Transform," Chenlei Guo, Qi Ma, Liming Zhang, IEEE Computer Vision and Pattern Recognition Conference (IEEE CVPR), 2008, and is incorporated by reference in its entirety. The technique described in this reference is provided for illustration purposes and should not be considered limiting. The techniques described in this disclosure may implement any scheme to determine the values of perception map 30 in examples where perception 30 is a saliency map, including examples where the values of the saliency map are not received.

As shown in FIG. 2, post processor 22 receives pixel values of image 24 and outputs enhanced pixel values of enhanced image 26. Pixel values may include pixel values associated with a single image, a 2D video (i.e. single channel video), or part of a 3D video (e.g. multi-channel video). Pixel values may be color values, as one example, and may be defined according to a standard video format. For example, pixel values may be in a standard red-green-blue (RGB). Examples of pixel values may include values in addition to color values such as coordinates and opacity values, as two examples.

In the example of FIG. 2, post processor 22 includes depth map processing unit 32, enhancement map unit 34, and enhancement unit 36. These units may be formed together or as separate units, as illustrated in FIG. 2. Depth map processing unit 32, enhancement map unit 34, and/or enhancement unit 36 may be implemented as hardware or as software executing on hardware. The output of enhancement unit 36 may be the pixel values for enhanced image 26.

Furthermore, although depth map processing unit 32, enhancement map unit 34, and enhancement unit 36 are illustrated as being formed in post processor 22, aspects of this disclosure are not so limited. In other examples, one or more of depth map processing unit 32, enhancement map unit 34, and enhancement unit 36 may be formed in one or more of the other processing units. As another example, depth map processing unit 32 and enhancement map unit 34 may each be individual units or formed together that are within device 10 and external to video processor 14, GPU 16, video codec 18, post processor 22, and the CPU of device 10. In these examples, depth map processing unit 32 and enhancement map unit 34 may be part of the one or more processing units that implement the example techniques described in this disclosure.

In some examples where depth map 28 is received by device 10 or generated by device 10, further modification to the values of depth map 28 may be appropriate. For example, the values of depth map 28 may be not ideal for determining which portions of image 24 should be enhanced relative to other portions, and by how much. In the example of FIG. 2, depth map processing unit 32 may modify the values of depth map 28 to generate values that may be more suitable for determining which portions should be enhanced and by how much. An example of depth map processing unit 32 is illustrated in more detail with respect to FIG. 5. In other examples, the values of depth map 28 may be suitable as is for enhancing portions of image 24 relative to other portions. In these examples, depth map processing unit 32 may not be needed, or may function as a pass through of the values of depth map 28.

Enhancement map unit 34 may receive the processed depth map 28 from depth map processing unit 32. In examples where post processor 22 does not include depth map processing unit 32, enhancement map unit 34 may directly receive the values of depth map 28. As illustrated, enhancement map unit 34 may also receive values of perception map 30. In some examples, post processor 22 may also include a perception map processing unit which modifies the values of perception map 30 to make the values more suitable for determining how much to enhance portions of image 24. However, such a perception map processing unit may not be necessary in every example of post processor 22, or may function as a pass through of the values of perception map 30.

Enhancement map unit 34 may implement various algorithms to determine how much a pixel of image 24 should be enhanced. As one example algorithm, enhancement map unit 34 may perform a weighted sum of values of depth map 28 and perception map 30 to generate an enhancement map. The values of the enhancement map may indicate how much a corresponding pixel of image 24 should be enhanced. In this example, enhancement unit 36 may receive the enhancement map from enhancement map unit 34 and enhance pixels of image 24 based on corresponding values of the enhancement map relative to other pixels.

For example, enhancement map unit 34 may bias the enhancement more towards the foreground or more towards objects with less motion and/or greater saliency by applying selectable or preprogrammed weights to the values of depth map 28 and perception map 30. The resulting values of the weighted sum may be indicative of how much the pixels should be enhanced, if at all. For instance, in examples where the values of perception map 30 are values of motion information, the resulting values of the weighted sum may indicate to enhancement unit 36 to enhance pixels for slow moving objects located in the foreground relative to pixels for objects located in background or pixels for fast moving objects.

In some examples, enhancement map unit 34 may similarly perform a weighted sum of values of depth map 28 and perception map 30, where perception map 30 is a saliency map. For example, the resulting values of the weighted sum, in this example, may indicate to enhancement unit 36 to enhance more salient pixels in portion of image 24 with objects located in the foreground as compared to portions of image 24 where the pixels are for objects in the background or for less salient pixels.

As one example, to perform the weighted sum, enhancement map unit 34 may implement the following function for each of the corresponding values of depth map 28 and perception map 30 that correspond to the same pixel in image 24:

$\beta = \gamma d + \delta(1-t)$, where $\gamma$ is a selectable or preprogrammed weight for values of perception map 30, d is one of the values of perception map 30, $\delta$ is a selectable or preprogrammed weight for values of depth map 28, and t is a one of the values of depth map 28 that corresponds to the value of d of perception map 30, where both d and t correspond to one of the pixels of image 24.

In this example, $\beta$ is the resulting weighted sum value for the corresponding pixel of image 24 that enhancement unit 36 may utilize to determine how much to enhance the corresponding pixel of image 24. For example, the enhancement map may include one β value for each pixel of image 24. The value of γ may be selectable or preprogrammed based on the desired amount of bias towards the values of perception map 30. For example, it may be desirable to ensure that objects are enhanced more based on movement or saliency as compared to depth within image 24, and the value of γ can be selected or preprogrammed to achieve such a result. Similarly, the value of δ may be selectable or preprogrammed based on the desired amount of bias towards the values of depth map 28. For example, it may be desirable to ensure that objects are enhanced more based on depth as compared to movement or saliency, and the value of δ can be selected or preprogrammed to achieve such a result.

The value d may be inversely correlated to the perceived "speed" in examples where perception map 30 is a motion information map. For example, the greater the perceived speed, the smaller the value of d. The value of t may be indicative of perceived "depth," and less than or equal to 1. In this example, the greater the value of t, the further back it is in image 24.

It should be understood that the correlation between the values of γ, δ, d, and t, and their respective biases, speed, and depth is provided for illustration purposes only, and should not be considered limiting. Furthermore, the equation for β is provided for illustration purposes only, and should not be considered limiting. In general, enhancement map unit 34 may implement any algorithm that determines the amount of enhancement to be applied on pixels of image 24 based on values of depth map 28 and perception map 30.

As illustrated, enhancement unit 36 may receive the results of the weighted sum from enhancement map unit 34 and the pixel values of image 24. Enhancement unit 36 may then enhance pixel values (e.g., color values) of image 24 based on corresponding weighted sum values. There may be various ways in which enhancement unit 36 may utilize the weighted sum values to enhance a first portion of image 24 relative to a second portion of image 24.

For example, enhancement unit 36 may establish a threshold value for the weighted sum values. Pixels whose corresponding weighted sum values are greater than or equal to the threshold value may be pixels in a first portion of image 24. Pixels whose corresponding weighted sum values are less than the threshold value may be pixels in a second portion of image 24. As one example of enhancing the first portion relative to the second portion of image 24, enhancement unit 36 may enhance pixels in the first portion of image 24, and not enhance pixels in the second portion of image 24. As another example, enhancement unit 36 may blur pixels in the second portion of image 24, and not blur pixels in the first portion of image 24. As yet another example, enhancement unit 36 may enhance pixels in the first portion of image 24, and blur pixels in the second portion of image 24. In any of these example cases, the first portion may appear clearer than the second portion. In this manner, the example techniques may enhance a first portion of image 24 relative to a second portion of image 24.

Enhancement unit 36 may be configured to implement any type of enhancement technique. As examples, enhancement unit 36 may implement one or more of contrast enhancement, sharpening and blurring, and color enhancement, although aspects of this disclosure should not be considered limited to contrast enhancement, sharpening and blurring, and color enhancement. An example of enhancement unit 36 is described in greater detail with respect to FIG. 3.

The preceding examples described image 24 as being a single, still image or an image of a video. There may be at least two examples of images for a video, and the techniques of this disclosure are extendable to both examples of video. One example of video is generally referred to as mono-view video, and another example of video is multi-view video. A subset of multi-view video is stereoscopic video.

In stereoscopic video, which may referred to as three dimensional (3D) video, device 10 may simultaneously display two images on display 12, where one image is viewable by the left-eye, and not the right-eye, and another image is viewable by the right-eye, and not the left-eye. The left-eye image and the right-eye image may include substantially similar image content; however, there may be slight displacement in the corresponding pixels. The simultaneous viewing of the left-eye image and the right-eye image may cause the viewer to perceive a single image that pops out of or into display 12, which provides the viewer with a 3D experience.

Multi-view video is an extension of stereoscopic view. For example, multi-view video is based on a similar premise to generate a 3D experience, but creates more than just left and right-eye images so that the appearance of 3D occurs no matter the direction from where the viewer is viewing the video, and more particularly when the user is not wearing any specific glasses to view the 3D image. For purposes of illustration, the technique is described for stereoscopic video; however, the technique may be similarly extendable to multi-view.

In mono-view video, which may be referred to as two dimensional (2D) video, device 10 may display one image on display 12 at a time. The viewer may not experience any 3D effects. For example, the video may appear bounded to within display 12. In both stereoscopic video and mono-view video, the images may be 3D images in that there may be perspective depth to the objects within the video. However, each of the images are constrained to the boundary of display 12. It is only when the left-eye image and right-eye image of stereoscopic video are viewed simultaneously does the viewer perceive a single image that pops out of or into display 12.

The example techniques described in this disclosure may be extendable to stereoscopic video or multi-view video. For example, image 24 may be one of the left-eye image or the right-eye image of stereoscopic video, and memory 20 may store both the left-eye image and the right-eye image. In examples where image 24 is for stereoscopic video, depth map 28 may be referred to as a disparity map. In this case, depth map 28 may be referred to as a disparity map because the disparity map may includes values indicative of perspective depth of objects within image 24 and values indicative of perspective depth of objects for the corresponding other eye image. For example, if image 24 is the left-eye image, then depth map 28 (e.g., the disparity map) may include values indicative of the depth of the objects in the left-eye image (i.e., image 24), and the corresponding right-eye image, and vice-versa.

In examples where image 24 is for stereoscopic video, enhancement map unit 34 may receive depth map 28 (e.g., disparity map) for image 24, which is also the depth map for the other image of stereoscopic video. In this example, enhancement map unit 34 may generate a single enhancement map that enhancement unit 36 utilizes to enhance pixels of both images of the stereoscopic video. Enhancement unit 36 may receive the pixel values (e.g., color values) for both the right-eye image and the left-eye image of stereoscopic video, and may enhance the right-eye image and the left-eye image using the single enhancement map. In some instances, if the amount of enhancement that enhancement unit 36 applies to the right-eye image is different that the amount of enhancement applied to the left-eye image, the simultaneous viewing of the enhanced right-eye and left-eye images may not produce proper 3D effect. To address this, enhancement unit 36 may apply the same amount of enhancement on both the right-eye and left-eye images.

In some examples where image 24 is an image for stereoscopic video, post processor 22 may enhance image 24 and the corresponding image of stereoscopic video (e.g., both the right-eye and left-eye images) using only depth information. In these examples, perception map 30 may not be necessary. However, in alternate examples post processor 22 may utilize both depth map 28 and perception map 30 even in examples where image 24 is an image for stereoscopic video. In examples where enhancement unit 36 utilizes the values of depth map 28, but not perception map 30, the enhancement map may be the selectable or programmed value "δ," as described above, multiplied by the values of depth map 28. In examples where enhancement unit 36 utilizes both the values from depth map 28 and perception map 30, the enhancement map may include the value for "β" for each corresponding pixel of image 24.

Figure 3:
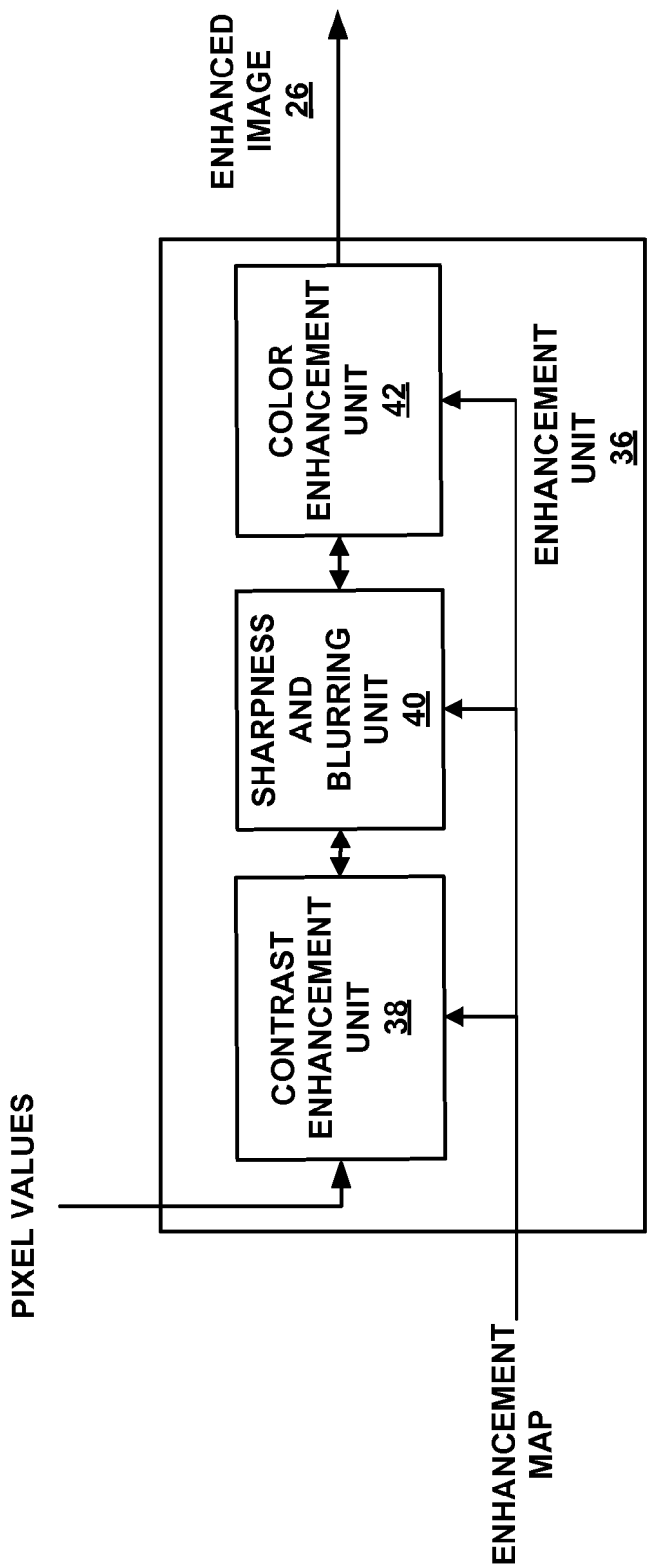
FIG. 3 is a block diagram illustrating an example of an enhancement unit that may implement one or more techniques described in this disclosure.

FIG. 3 is a block diagram illustrating an example of an enhancement unit 36 that may implement one or more techniques described in this disclosure. In the example of FIG. 3, enhancement unit 36 includes contrast enhancement unit 38, sharpness and blurring unit 40, and color enhancement unit 42. In other examples, enhancement unit 36 may include fewer or more units than those illustrated in FIG. 3. For example, enhancement unit 36 may include all three of contrast enhancement unit 38, sharpness and blurring unit 40, and color enhancement unit 42, any two of the three, or any one of the three. In other words, enhancement unit 36 may apply one or more of these example enhancement techniques. For instance, enhancement unit 36 may utilize all three of contrast enhancement, sharpening and blurring, and color enhancement, any two of the three, or only one of the three. The output of enhancement unit 36 may be the pixel values for enhanced image 26.

Contrast enhancement unit 38 may change contrast of pixels within a first portion of image 24 relative to a second portion of image 24 based on the enhancement map generated by enhancement map unit 34. For example, the enhancement map may indicate to contrast enhancement unit 38 to increase the contrast of pixels for objects in the foreground that are moving slowly or are more salient compared to pixels for objects in the background or pixels for objects that are moving slowly or are less salient.

Sharpness and blurring unit 40 may sharpen or blur pixels based on an enhancement map. For example, sharpness and blurring unit 40 may sharpen the foreground pixels, blur the background pixels, or both sharpen the foreground pixels and blur the background pixels based on the enhancement map. Sharpness and blurring unit 40 may blur foreground pixels if an object in the foreground is perceived to be in motion based on the enhancement map.

Color enhancement unit 42 may change color values of pixels based on an enhancement map. For example, humans perceive foreground objects as being "warmer" in color then background objects. Based on this, color enhancement unit 42 may increase the "redness" of foreground pixels and decrease the "redness" of background pixels. It should be noted that the enhancements performed by contrast enhancement unit 38, sharpness and blurring unit 40, and color enhancement unit 42 may be performed sequentially in any number of orders or performed in parallel.

Figure 4:
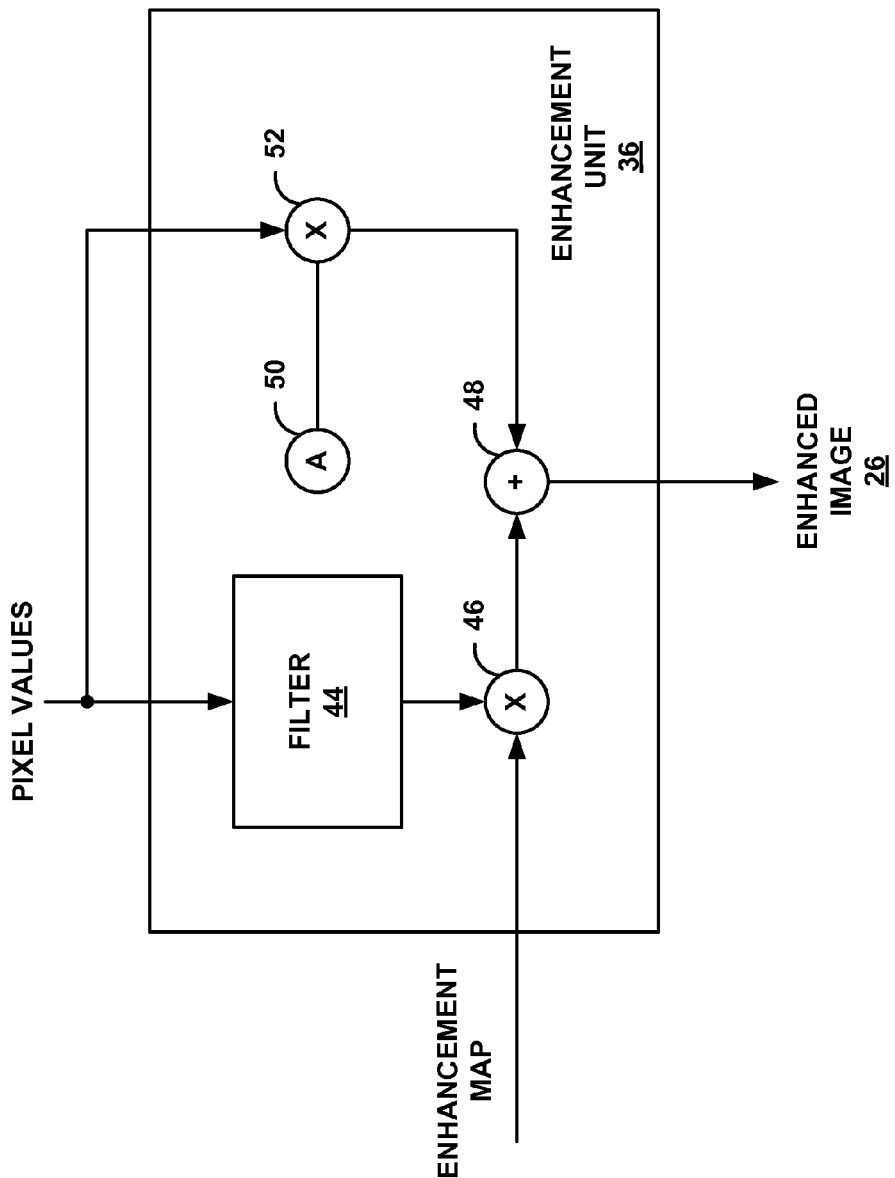
FIG. 4 is a block diagram illustrating another example of an enhancement unit that may implement one or more techniques described in this disclosure.

Enhancement unit 36 may apply any of the example enhancement techniques for images of stereoscopic video described above. In some situations, there may be other enhancement techniques that are more suitable for images of stereoscopic video. FIG. 4 is a block diagram illustrating another example of an enhancement unit 36 that may implement one or more techniques described in this disclosure. The example enhancement unit 36, illustrated in FIG. 4, may be a suitable example of enhancement unit 36 when image 24 is one of the images for stereoscopic video. For purposes of illustration, assume that image 24 is the left-eye image.

As illustrated in FIG. 4, in this example of enhancement unit 36, enhancement unit 36 includes filter 44, multiplier 46, summer 48, and multiplier 52. In some examples, enhancement unit 36 may be preprogrammed with constant value 50, represented by "A" in FIG. 4. Alternatively, constant value 50 may selectable.

Filter 44 may receive pixel values of image 24 (e.g., the left-eye image) and high-pass filter the pixel values. There may be various ways in which filter 44 may high-pass filter the pixel values. As one example, filter 44 may low-pass filter the pixel values and subtract the low-pass filtered pixel values from the original pixel values to generate the high-pass filter pixel values. To low-pass filter the pixel values, filter 44 may multiply the pixel values with a 5×5 Gaussian kernel, as one example. The filtering technique of filter 44 is provided for illustration purposes only, and should not be considered limiting. In another example, a 3×3 or 5×5 kernel may be used. In this example, a low pass filter kernel of these dimensions can be derived from a circularly symmetric Gaussian spread function with fixed standard deviation. The high pass kernel can then be simply computed as 1. Further, the low pass kernel weights can be normalized such that their magnitude is between 0 and 1. In general, aspects of this disclosure are extendable to any high-pass filtering technique.

Multiplier 46 may receive the high-pass filtered pixel values from filter 44 and the enhancement map and may multiply the values together. One example of the value of the enhancement map may be the value for "β" for each corresponding pixel of image 24, as described above, in examples where the enhancement map, for stereoscopic video, is based on values of depth map 28 and perception map 30. Another example of the value of the enhancement map may be the value for "δ," as described above, multiplied by the values of depth map 28, in examples where the enhancement map, for stereoscopic video, is based on values of depth map 28, and not on values of perception map 30.

Multiplier 52 may also receive the pixel values of image 24 and multiply the pixel values with constant value 50. Constant value 50 may be a selectable or preprogrammed value. Summer 48 may receive values from multiplier 46 and from multiplier 52, and sum the values together. The result of the summation may be pixel values for enhanced image 26. Enhancement unit 36, as illustrated in FIG. 4, may perform similar techniques to enhance the other image, corresponding to image 24, of the stereoscopic video (e.g., the right-eye image).

Figure 5:
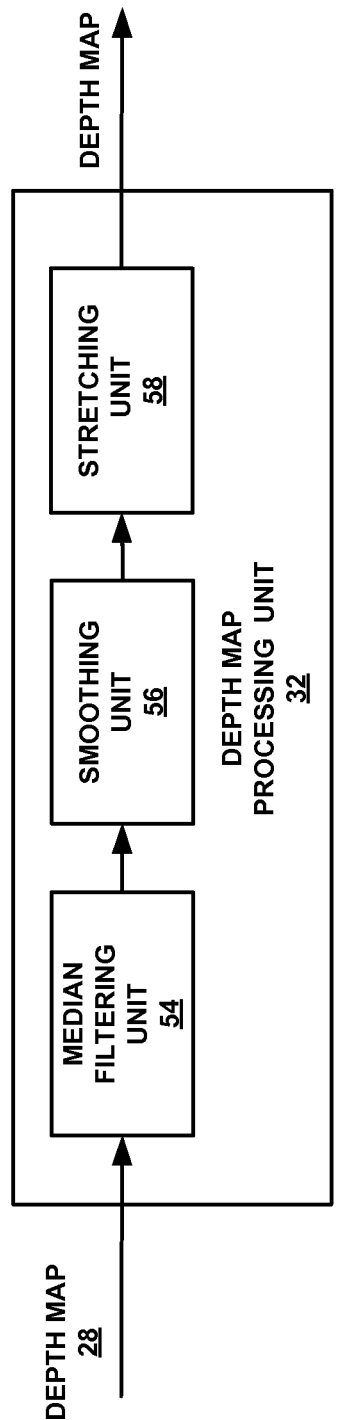
FIG. 5 is a block diagram that illustrates an example of a depth map processing unit that may implement one or more techniques described in this disclosure.

FIG. 5 is a block diagram that illustrates an example of a depth map processing unit 32 that may implement one or more techniques described in this disclosure. As described above, in some examples, the received or generated values of depth map 28 may not be ideally suitable for determining which portions of image 24 should be enhanced relative to other portions. For example, depth map 28 may include noise which may make it less useful for image enhancement. Depth map processing unit 32 may filter such noise, as well as perform other processing on the values of depth map 28 to generate values for suitable for use in image enhancement. Also, as described above, depth map processing unit 32 may not be necessary in every example.

The example depth map processing unit 32 illustrated in FIG. 5 may include a median filtering unit 54, a smoothing unit 56, and a stretching unit 58. Median filtering unit 54 may remove impulse noise in a received depth map 28 by applying a preprogrammed or selectable filter. Smoothing unit 56 may remove "holes" in a depth map 28 by replacing depth values of pixels with values of neighboring depth values. For example, if a pixel has a 0 depth value, but is surrounded by pixels with higher depth values, the pixel can inherit a higher depth value. This way pixels making up an object will appear to have similar depth and the object will appear more continuous.

Stretching unit 58 may increase the dynamic range of the of received depth map values using histogram stretching or look-up table mapping. For example, a received depth map 28 may have a maximum depth value of 17. Stretching unit 58 may increase this value to 255, as one example, to further enhance the perceived depth of image 24. It should be noted that although the depth data processing unit 32 illustrated in the example FIG. 5 is described as processing a depth map, in other examples, post processor 22 may include a perception map processing unit to similarly process values of perception map 30 such that objects within image 24 are more continuous and are more clearly distinguished from one another.

Figure 6:
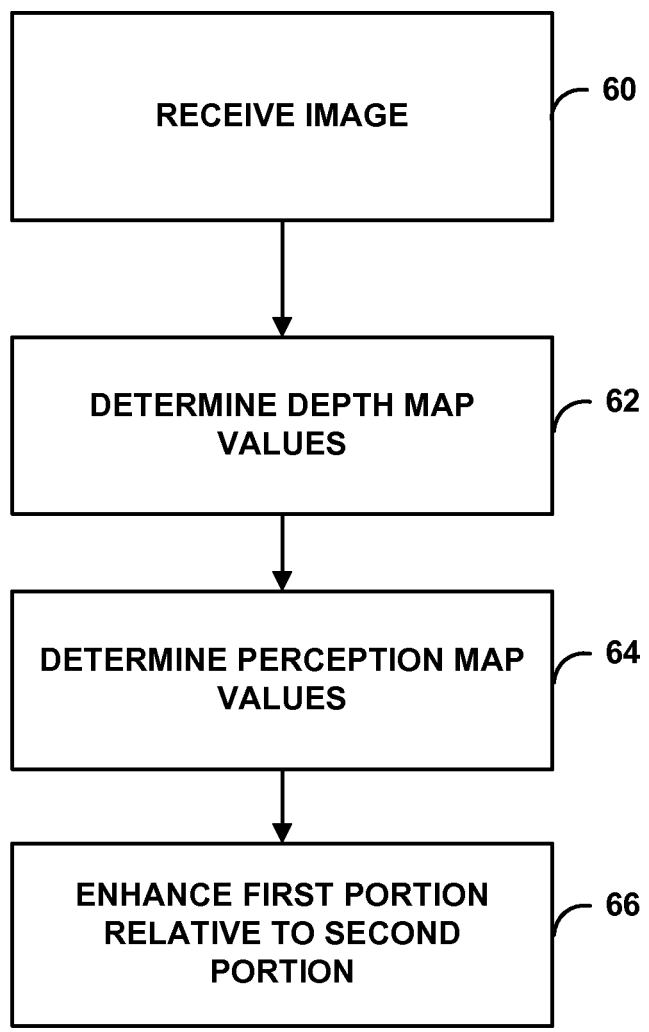
FIG. 6 is a flowchart illustrating example techniques in accordance with one or more examples described in this disclosure.

FIG. 6 is a flowchart illustrating example techniques in accordance with one or more examples described in this disclosure. It should be noted that all of the steps illustrated in FIG. 6 need not be performed in every instance. One or more steps may not be performed, or may be performed in an order different than that illustrated in FIG. 6. For purposes of illustration only, reference is made to FIGS. 1-5.

One or more processing units may receive an image (60). Examples of the processing units include video processor 14, GPU 16, video codec 18, post processor 22, and a CPU of device 10. An example of the received image may be image 24 that the one or more processing units receive from memory 20 for image enhancement.

The one or more processing units may determine depth map values for a depth map for the image that indicates relative depth of the pixels within the image (62). For example, post processor 22 may determine depth map values for depth map 28. The depth map values may indicate relative depth of the pixels, such as which pixels are within objects that are in the foreground and which pixels are within objects that are in the background.

The one or more processing units may determine perception map values for a perception map for the image (64). For example, the perception map values may be for perception map 30. In some examples, the perception map values may be indicative of motion information, which may provide a measure of whether an object is moving relatively fast or relatively slowly. In some examples, the perception may values may be indicative of how salient pixels are within image 24.

The one or more processing units may enhance a first portion of the image relative to the second portion of the image based on at least the depth map values and the perception map values (66). There may be various ways in which the one or more processing units may enhance the first portion relative to the second portion. For instance, the one or more processing units may enhance the first portion, and not enhance the second portion. As another example, the one or more processing units may blur the second portion, and not blur the first portion. As yet another example, the one or more processing units may enhance the first portion and blur the second portion.

In some examples, the one or more processing units may determine pixels for objects that are in a foreground of the image, and motion information of the objects in the image. In these examples, the one or more processing units may enhance pixels for objects that are in the foreground of the image and that are moving slowly relative to pixels for objects that are in the background of the image and pixels for objects that are moving quickly.

In some examples, the one or more processing units may determine pixels for objects that are in a foreground of the image, and saliency information of the pixels in the image. In these examples, the one or more processing units may enhance pixels that are more salient and for objects that are in the foreground of the image relative to pixels that are less salient and for objects that are in the background of the image.

Figure 7:
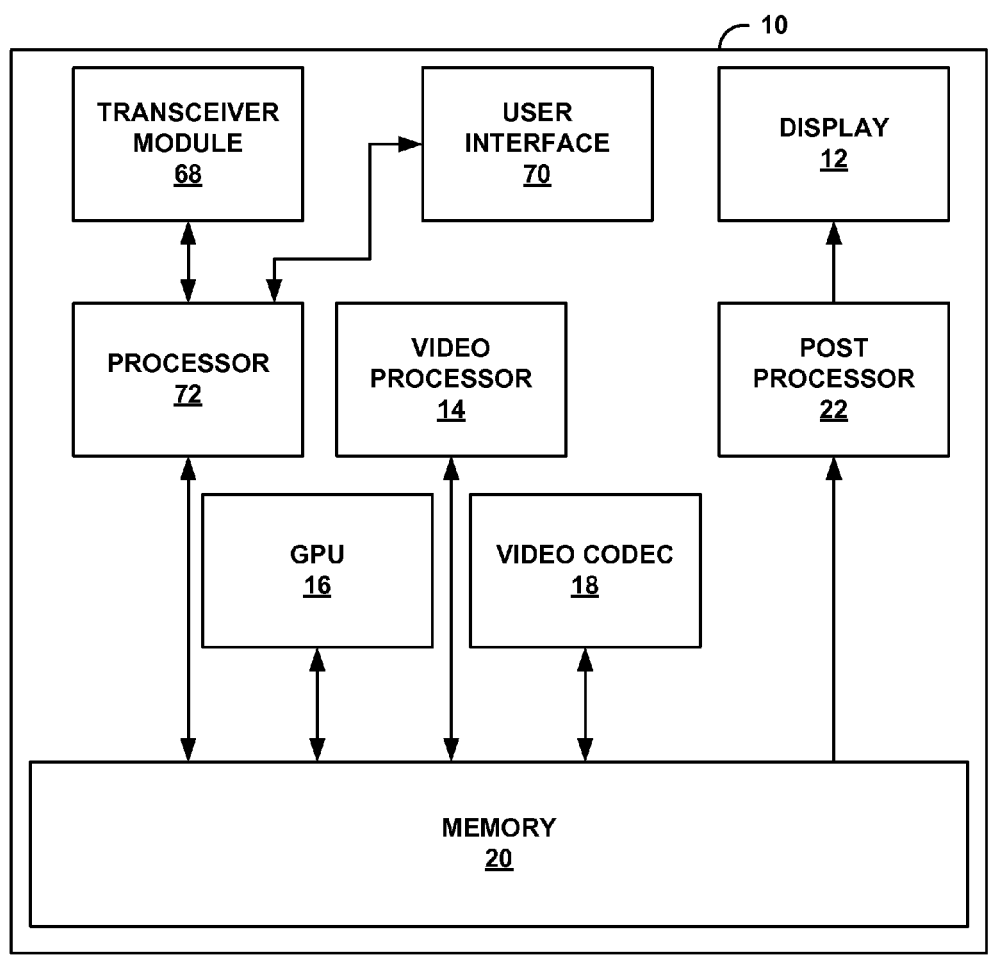
FIG. 7 is a block illustrating another example of a device that may be operable to implement one or more aspects of this disclosure.

FIG. 7 is a block illustrating another example of a device that may be operable to implement one or more aspects of this disclosure. For example, FIG. 7 illustrates device 10 of FIG. 1 in greater detail. For purposes of brevity, only the components of device 10 that are illustrated in FIG. 7, but not illustrated in FIG. 1 are described in detail.

In the example of FIG. 7, device 10 may include display 12, video processor 14, GPU 16, video codec 18, memory 20, post processor 22, transceiver module 68, user interface 70, and processor 72. Processor 72 may be the central processing unit (CPU) of device 10. Although this disclosure describes post processor 22 as implementing the example techniques described in this disclosure, it may be possible for any processing unit of device 10 to implement the example techniques. The processing unit may be one or more of processor 72, video processor 14, GPU 16, video codec 18, and post processor 22, or some other processing unit not illustrated in FIGS. 1 and 9.

Device 10 may include additional modules or units not shown in FIG. 7 for purposes of clarity. For example, device 10 may include a speaker and a microphone, neither of which are shown in FIG. 7, to effectuate telephonic communications in examples where device 10 is a mobile wireless telephone, or a speaker where device 10 is a media player. Device 10 may also include a video camera. Furthermore, the various modules and units shown in device 10 may not be necessary in every example of device 10. For example, user interface 70 and display 12 may be external to device 10 in examples where device 10 is a desktop computer or other device that is equipped to interface with an external user interface or display.

Examples of user interface 70 include, but are not limited to, a trackball, a mouse, a keyboard, and other types of input devices. User interface 70 may also be a touch screen and may be incorporated as a part of display 12. Transceiver module 68 may include circuitry to allow wireless or wired communication between device 10 and another device or a network. Transceiver module 68 may include modulators, demodulators, amplifiers and other such circuitry for wired or wireless communication.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise random access memory (RAM), read-only memory (ROM), EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method for image processing comprising:
   receiving a constructed image that includes a first portion and a second portion;
   determining depth map values for a depth map for the constructed image that indicates relative depth of pixels within the constructed image by at least determining which pixels are for objects in a foreground of the constructed image;
   determining perception map values for a perception map for the constructed image by at least determining motion information of pixels of objects in the constructed image; and
   enhancing the first portion of the constructed image relative to the second portion of the constructed image based on at least the depth map values and the perception map values to generate an enhanced version of the constructed image, wherein the first portion of the constructed image includes pixels for objects that are in the foreground of the constructed image and that are moving slower than a threshold, as determined by the perception map values, and wherein the second portion of the constructed image includes pixels of objects that are in a background of the constructed image and pixels of objects that are moving faster than the threshold, as determined by the perception map values.

2. The method of claim 1, wherein enhancing the first portion of the constructed image relative to the second portion of the constructed image comprises at least one of:
   enhancing pixels within the first portion, and not enhancing pixels within the second portion;
   blurring the pixels within the second portion, and not blurring the pixels within the first portion; and
   enhancing the pixels within the first portion, and blurring the pixels within the second portion.

3. The method of claim 1,
   wherein determining perception map values comprises determining saliency information for pixels in the constructed image, and
   wherein enhancing the first portion of the constructed image relative to the second portion comprises enhancing pixels that are more salient and for objects that are in the foreground of the constructed image relative to pixels that are less salient and for objects that are in a background of the constructed image.

4. The method of claim 1, wherein the perception map comprises a motion information map indicative of perspective speed of objects in the constructed image, or the motion information map indicative of perspective speed of objects in the constructed image and a saliency map indicative of saliency of pixels in the constructed image.

5. The method of claim 1, wherein the constructed image comprises a first constructed image of stereoscopic video for a first eye, the method further comprising:
   receiving a second constructed image of the stereoscopic video for a second eye, wherein image content of the first constructed image and the second constructed image is substantially similar; and
   enhancing a first portion of the second constructed image relative to a second portion of the second constructed image based on at least the depth map values for the first constructed image and the perception map values for the first constructed image.

6. The method of claim 1, further comprising:
   performing a weighted sum on the depth map values and the perception map values to generate enhancement map values for an enhancement map,
   wherein enhancing the first portion of the constructed image relative to the second portion of the constructed image comprises enhancing the first portion of the constructed image relative to the second portion of the constructed image based on the enhancement map values.

7. The method of claim 1, further comprising, at least one of:
   filtering the depth values of the depth map;
   smoothing the depth values of the depth map; and
   histogram stretching the depth values of the depth map.

8. The method of claim 1, wherein the constructed image and the enhanced version of the constructed image are from the same view.

9. A device comprising:
   a memory configured to store a constructed image that includes a first portion and a second portion; and
   one or more processing units configured to:
      receive the constructed image;
      determine depth map values for a depth map for the constructed image that indicates relative depth of pixels within the constructed image by at least determining which pixels are for objects in a foreground of the constructed image;

determine perception map values for a perception map for the constructed image by at least determining motion information of objects in the constructed image; and enhance the first portion of the constructed image relative to the second portion of the constructed image based on at least the depth map values and the perception map values to generate an enhanced version of the constructed image, wherein the first portion of the constructed image includes pixels for objects that are in the foreground of the constructed image and that are moving slower than a threshold, as determined by the perception map values, and wherein the second portion of the constructed image includes pixels of objects that are in a background of the constructed image and pixels of objects that are moving faster than the threshold, as determined by the perception map values.

10. The device of claim 9, wherein to enhance the first portion of the constructed image relative to the second portion, the one or more processing units are configured to, at least one of:

enhance pixels within the first portion, and not enhance pixels within the second portion;

blur the pixels within the second portion, and not blur the pixels within the first portion; and enhance the pixels within the first portion, and blur the pixels within the second portion.

11. The device of claim 9, wherein the one or more processing units are configured to:

determine perception map values for the perception map by at least determining saliency information for pixels in the constructed image, and enhance the first portion of the constructed image relative to the second portion by at least enhancing pixels that are more salient and for objects that are in the foreground of the constructed image relative to pixels that are less salient and for objects that are in a background of the constructed image.

12. The device of claim 9, wherein the perception map comprises a motion information map indicative of perspective speed of objects in the constructed image, or the motion information map indicative of perspective speed of objects in the constructed image and a saliency map indicative of saliency of pixels in the constructed image.

13. The device of claim 9, wherein the constructed image comprises a first constructed image of stereoscopic video for a first eye, wherein the one or more processing units are configured to:

receive a second constructed image of the stereoscopic video for a second eye, wherein image content of the first constructed image and the second constructed image is substantially similar; and enhance a first portion of the second constructed image relative to a second portion of the second constructed image based on at least the depth map values for the first constructed image and the perception map values for the first constructed image.

14. The device of claim 9, wherein the one or more processing units are configured to:

perform a weighted sum on the depth map values and the perception map values to generate enhancement map values for an enhancement map; and enhance the first portion of the constructed image relative to the second portion of the constructed image based on the enhancement map values.

15. The device of claim 9, wherein the one or more processing units are configured to, at least one of:

filter the depth values of the depth map;

smooth the depth values of the depth map; and histogram stretch the depth values of the depth map.

16. A device comprising:

means for receiving a constructed image that includes a first portion and a second portion;

means for determining depth map values for a depth map for the constructed image that indicates relative depth of pixels within the constructed image by at least determining which pixels are for objects in a foreground of the constructed image;

means for determining perception map values for a perception map for the constructed image by at least determining motion information of objects in the constructed image; and means for enhancing the first portion of the constructed image relative to the second portion of the constructed image based on at least the depth map values and the perception map values to generate an enhanced version of the constructed image, wherein the first portion of the constructed image includes pixels for objects that are in the foreground of the constructed image and that are moving slower than a threshold, as determined by the perception map values, and wherein the second portion of the constructed image includes pixels of objects that are in a background of the constructed image and pixels of objects that are moving faster than the threshold, as determined by the perception map values.

17. The device of claim 16, wherein the means for enhancing the first portion of the constructed image relative to the second portion of the constructed image comprises at least one of:

means for enhancing pixels within the first portion, and not enhancing pixels within the second portion;

means for blurring the pixels within the second portion, and not blurring the pixels within the first portion; and means for enhancing the pixels within the first portion, and blurring the pixels within the second portion.

18. The device of claim 16, wherein the means for determining perception map values comprises means for determining saliency information for pixels in the constructed image, and wherein the means for enhancing the first portion of the constructed image relative to the second portion comprises means for enhancing pixels that are more salient and for objects that are in the foreground of the constructed image relative to pixels that are less salient and for objects that are in a background of the constructed image.

19. The device of claim 16, wherein the perception map comprises a motion information map indicative of perspective speed of objects in the constructed image, or the motion information map indicative of perspective speed of objects in the constructed image and a saliency map indicative of saliency of pixels in the constructed image.

20. The device of claim 16, wherein the constructed image comprises a first constructed image of stereoscopic video for a first eye, the device further comprising means for receiving a second constructed image of the stereoscopic video for a second eye, wherein image content of the first constructed image and the second constructed image is substantially similar; and means for enhancing a first portion of the second constructed image relative to a second portion of the second constructed image based on at least the depth map values for the first constructed image and the perception map values for the first constructed image.

21. The device of claim 16, further comprising:
means for performing a weighted sum on the depth map values and the perception map values to generate enhancement map values for an enhancement map,
wherein the means for enhancing the first portion of the constructed image relative to the second portion of the constructed image comprises means for enhancing the first portion of the constructed image relative to the second portion of the constructed image based on the enhancement map values.

22. The device of claim 16, further comprising, at least one of:
means for filtering the depth values of the depth map;
means for smoothing the depth values of the depth map; and
means for histogram stretching the depth values of the depth map.

23. A non-transitory computer-readable storage medium comprising instructions that cause one or more processors to:
receive a constructed image that includes a first portion and a second portion by at least determining which pixels are for objects in a foreground of the constructed image;
determine depth map values for a depth map for the constructed image that indicates relative depth of pixels within the constructed image by at least determining motion information of objects in the constructed image;
determine perception map values for a perception map for the constructed image; and
enhance a first portion of the constructed image relative to a second portion of the constructed image based on at least the depth map values and the perception map values to generate an enhanced version of the constructed image, wherein the first portion of the constructed image includes pixels for objects that are in the foreground of the constructed image and that are moving slower than a threshold, as determined by the perception map values, and wherein the second portion of the constructed image includes pixels of objects that are in a background of the constructed image and pixels of objects that are moving faster than the threshold, as determined by the perception map values.

24. The non-transitory computer-readable storage medium of claim 23, wherein the instructions to enhance the first portion of the constructed image relative to the second portion comprise instructions to at least one of:
enhance pixels within the first portion, and not enhance pixels within the second portion;
blur the pixels within the second portion, and not blur the pixels within the first portion; and
enhance the pixels within the first portion, and blur the pixels within the second portion.

25. The non-transitory computer-readable storage medium of claim 23,
wherein the instructions to determine perception map value comprise instructions to determine saliency information for pixels in the constructed image, and
wherein the instructions to enhance the first portion of the constructed image relative to the second portion comprise instructions to enhance pixels that are more salient and for objects that are in the foreground of the constructed image relative to pixels that are less salient and for objects that are in a background of the constructed image.

26. The non-transitory computer-readable storage medium of claim 23, wherein the perception map comprises a motion information map indicative of perspective speed of objects in the constructed image, or the motion information map indicative of perspective speed of objects in the constructed image and a saliency map indicative of saliency of pixels in the constructed image.

27. The non-transitory computer-readable storage medium of claim 23, wherein the constructed image comprises a first constructed image of stereoscopic video for a first eye, the instructions further comprising instructions that cause the one or more processors to:
receive a second constructed image of the stereoscopic video for a second eye, wherein image content of the first constructed image and the second constructed image is substantially similar; and
enhance a first portion of the second constructed image relative to a second portion of the second constructed image based on at least the depth map values for the first constructed image and the perception map values for the first constructed image.

28. The non-transitory computer-readable storage medium of claim 23, wherein the instructions further comprise instructions that cause the one or more processors to:
perform a weighted sum on the depth map values and the perception map values to generate enhancement map values for an enhancement map,
wherein the instructions to enhance the first portion of the constructed image relative to the second portion of the constructed image comprises instructions to enhance the first portion of the constructed image relative to the second portion of the constructed image based on the enhancement map values.

29. The non-transitory computer-readable storage medium of claim 23, further comprising instructions that cause the one or more processors to, at least one of:
filter the depth values of the depth map;
smooth the depth values of the depth map; and
histogram stretch the depth values of the depth map.

* * * * *